US011265595B2

(12) United States Patent
Onishi et al.

(10) Patent No.: US 11,265,595 B2
(45) Date of Patent: Mar. 1, 2022

(54) COMMUNICATION SYSTEM, TRANSMISSION APPARATUS, RECEPTION APPARATUS, COMMUNICATION SYSTEM CONTROL METHOD, AND PROGRAM

(71) Applicant: Sony Interactive Entertainment Inc., Tokyo (JP)

(72) Inventors: Katsuyoshi Onishi, Tokyo (JP); Yoshio Miyazaki, Tokyo (JP)

(73) Assignee: Sony Interactive Entertainment Inc., Tokyo (JP)

(*) Notice: Subject to any disclaimer, the term of this patent is extended or adjusted under 35 U.S.C. 154(b) by 9 days.

(21) Appl. No.: 15/754,789

(22) PCT Filed: Oct. 4, 2016

(86) PCT No.: PCT/JP2016/079494
§ 371 (c)(1),
(2) Date: Feb. 23, 2018

(87) PCT Pub. No.: WO2017/061428
PCT Pub. Date: Apr. 13, 2017

(65) Prior Publication Data
US 2018/0255349 A1 Sep. 6, 2018

(30) Foreign Application Priority Data
Oct. 6, 2015 (JP) .............................. JP2015-198735

(51) Int. Cl.
*H04N 21/4363* (2011.01)
*H04W 48/16* (2009.01)
(Continued)

(52) U.S. Cl.
CPC ....... *H04N 21/43637* (2013.01); *A63F 13/25* (2014.09); *A63F 13/30* (2014.09);
(Continued)

(58) Field of Classification Search
CPC ........ A63F 13/25; A63F 13/30; A63F 13/327; A63F 13/358; G02B 27/017; H04L 67/38;
(Continued)

(56) References Cited

U.S. PATENT DOCUMENTS 6,028,631 A * 2/2000 Nakaya .................... H04N 7/14
340/7.27
7,151,948 B2 12/2006 Ishii
(Continued)

FOREIGN PATENT DOCUMENTS

CN 1469655 A 1/2004
CN 101432991 A 5/2009
(Continued)

OTHER PUBLICATIONS

Supplementary European Search Report for corresponding EP Application No. 16853582, 12 pages, dated Feb. 22, 2019.
(Continued)

*Primary Examiner* — Chris Parry
*Assistant Examiner* — Dixon F Dabipi
(74) *Attorney, Agent, or Firm* — Matthew B. Dernier, Esq.

(57) ABSTRACT

Provided are a communication system, a transmission apparatus, a reception apparatus, a communication system control method, and a program that permit selection of an appropriate communication path in accordance with the amount of time until data generated by the transmission apparatus is rendered available for use by the reception apparatus. A first transmission section sends encoded data to a first reception section. A second transmission section sends encoded data to a second reception section. The first transmission section has a higher maximum possible transmission rate than the second transmission section. A pre-transmission process execution section encodes data at a higher
(Continued)

compression ratio at the time of transmission by the second transmission section than the compression ratio at the time of transmission by the first transmission section. A transmission control section controls which data, the data received by the first reception section or the data received by the second reception section, is used by an HMD based on the amount of time from generation of data to when the data is rendered available for use by the HMD.

10 Claims, 8 Drawing Sheets

(51) Int. Cl.
  *H04W 88/06* (2009.01)
  *H04N 21/442* (2011.01)
  *H04W 84/12* (2009.01)
  *A63F 13/358* (2014.01)
  *A63F 13/327* (2014.01)
  *G02B 27/01* (2006.01)
  *A63F 13/25* (2014.01)
  *A63F 13/30* (2014.01)
  *H04N 19/42* (2014.01)
  *H04L 67/131* (2022.01)

(52) U.S. Cl.
  CPC .......... *A63F 13/327* (2014.09); *A63F 13/358* (2014.09); *G02B 27/017* (2013.01); *H04L 67/38* (2013.01); *H04N 19/42* (2014.11); *H04N 21/4363* (2013.01); *H04N 21/442* (2013.01); *H04W 48/16* (2013.01); *H04W 84/12* (2013.01); *H04W 88/06* (2013.01)

(58) Field of Classification Search
  CPC ............... H04N 19/42; H04N 21/4363; H04N 21/43637; H04N 21/442; H04W 48/16; H04W 84/12; H04W 88/06
  See application file for complete search history.

(56) References Cited

U.S. PATENT DOCUMENTS

| | | | |
|---|---|---|---|
| 8,234,547 B2 | 7/2012 | Liu | |
| 8,964,830 B2 | 2/2015 | Perlman | |
| 9,986,427 B2 | 5/2018 | Kimpe | |
| 2003/0236074 A1* | 12/2003 | Ishii | H04L 25/0218 455/69 |
| 2007/0183493 A1* | 8/2007 | Kimpe | G06F 21/6245 375/240.1 |
| 2009/0319845 A1 | 12/2009 | Liu | |
| 2010/0166068 A1* | 7/2010 | Perlman | A63F 13/86 375/240.12 |
| 2011/0073654 A1* | 3/2011 | Wang | G06K 7/10297 235/462.25 |
| 2012/0173668 A1 | 7/2012 | Ogata | |
| 2012/0307746 A1* | 12/2012 | Hammerschmidt | H04W 72/1242 370/329 |
| 2012/0307886 A1 | 12/2012 | Agarwal | |
| 2014/0226710 A1 | 8/2014 | Park | |
| 2014/0364208 A1* | 12/2014 | Perry | G06F 3/14 463/31 |
| 2015/0127778 A1 | 5/2015 | De Vleeschauwer | |
| 2016/0173939 A1* | 6/2016 | Iwami | H04N 21/431 725/139 |

FOREIGN PATENT DOCUMENTS

| | | |
|---|---|---|
| CN | 102428484 A | 4/2012 |
| CN | 102811367 A | 12/2012 |
| EP | 1844612 A2 | 10/2007 |
| EP | 2211224 A1 | 7/2010 |
| EP | 2530997 A1 | 12/2012 |
| JP | 11187367 A | 7/1999 |
| JP | 2003287209 A | 3/2003 |
| JP | 2003309541 A | 10/2003 |
| JP | 2003348548 A | 12/2003 |
| JP | 2007049460 A | 2/2007 |
| JP | 2008252390 A | 10/2008 |
| JP | 2009021935 A | 1/2009 |
| JP | 2009521156 A | 5/2009 |
| JP | 2010062630 A | 3/2010 |
| JP | 2012186701 A | 9/2012 |
| JP | 2013229760 A | 11/2013 |
| JP | 2014523721 A | 9/2014 |
| JP | 2015526959 A | 9/2015 |
| WO | 2007077310 A1 | 7/2007 |
| WO | 2011030477 A1 | 3/2011 |
| WO | 2013048474 A1 | 4/2013 |
| WO | 2014001246 A1 | 1/2014 |
| WO | 2015033762 A1 | 3/2015 |

OTHER PUBLICATIONS

International Search Report for corresponding PCT Application No. PCT/JP2016/079494, 4 pages, dated Dec. 20, 2016.
Korean Intellectual Property Office Notice of Preliminary Rejection for corresponding KR Application No. 10-2018-7008636, 12 pages, dated Mar. 13, 2019.
Notification of Reason for Refusal for corresponding JP Application No. 2017-544506, 11 pages, dated Sep. 25, 2018.
Notification of Reasons for Refusal for corresponding JP Application No. 2017-544506, 41 pages, dated Nov. 12, 2019.
The First Office Action for corresponding CN Application No. 201680057697.3, 16 pages, dated Jan. 6, 2020.
The Third Office Action for corresponding CN Application No. 201680057697.3, 12 pages, dated Jan. 28, 2021.

* cited by examiner

COMMUNICATION SYSTEM, TRANSMISSION APPARATUS, RECEPTION APPARATUS, COMMUNICATION SYSTEM CONTROL METHOD, AND PROGRAM

TECHNICAL FIELD

The present invention relates to a communication system, a transmission apparatus, a reception apparatus, a communication system control method, and a program.

BACKGROUND ART

A technology is known that switches between transmission sections or reception sections to handle communication in accordance with the radio wave condition for wireless communication in a transmission apparatus having a plurality of transmission sections or a reception apparatus having a plurality of reception sections.

SUMMARY

Technical Problem

Transmission and reception of videos through wireless communication has been under study in recent years. For example, currently under study is wireless transmission of a video depicting a game play status generated by a gaming apparatus that executes a game program to a head-mounted display (HMD) and display of the video on the HMD.

When wireless communication is used for such a purpose, it is important to shorten the amount of time (latency) until data generated by a transmission apparatus is rendered available for use by a reception apparatus in order to reduce the sense of discomfort felt by the player during operation. Specifically, it is important to shorten the amount of time until a video generated by a gaming apparatus is displayed on an HMD. For this reason, an appropriate communication path is preferably selected in accordance with latency to engage in wireless communication for the above purpose.

In prior arts, however, selection of communication path has not been made in accordance with latency. For this reason, it could not be said that prior arts can adequately deal with wireless communication for the above purpose.

In light of the foregoing, it is an object of the present invention to provide a communication system, a transmission apparatus, a reception apparatus, a communication system control method, and a program that permit selection of an appropriate communication path in accordance with the amount of time until data generated by the transmission apparatus is rendered available for use by the reception apparatus.

Solution to Problem

In order to solve the above object, a communication system according to the present invention includes a transmission apparatus and a reception apparatus. The transmission apparatus includes a generation section, an encoding section, a first transmission section, and a second transmission section. The generation section generates data. The encoding section encodes the data. The first transmission section can communicate with the reception apparatus. The second transmission section can communicate with the reception apparatus. The reception apparatus includes a first reception section, a second reception section, and a decoding section. The first reception section can communicate with the first transmission section. The second reception section can communicate with the second transmission section. The decoding section decodes the encoded data. The first transmission section sends the data generated by the generation section and encoded by the encoding section to the first reception section. The second transmission section sends the data generated by the generation section and encoded by the encoding section to the second reception section. The first transmission section has a higher maximum possible transmission rate than the second transmission section. The encoding section encodes the data at a higher compression ratio at the time of transmission by the second transmission section than the compression ratio at the time of transmission by the first transmission section. The communication system further includes a control section that controls which data, the data received by the first reception section or the data received by the second reception section, is used by the reception apparatus based on the amount of time from generation of the data by the generation section to when the data is rendered available for use by the reception apparatus.

In one mode of the present invention, the control section controls whether transmission by the first transmission section or transmission by the second transmission section takes place based on the amount of time from generation of the data by the generation section to when the data is rendered available for use by the reception apparatus.

In this mode, the communication system further includes a count identification section that identifies the number of times the amount of time from generation of the data by the generation section to when the data is rendered available for use by the reception apparatus exceeds a given time period when transmission by the second transmission section does not take place, but transmission by the first transmission section takes place. When the number of times reaches a given count, the control section may perform control such that transmission by the second transmission section takes place rather than transmission by the first transmission section from here onward.

Also, the transmission apparatus includes the control section, and the reception apparatus further includes an instruction section that instructs the transmission apparatus as to whether transmission by the first transmission section or transmission by the second transmission section should take place based on the amount of time from generation of the data by the generation section to when the data is rendered available for use by the reception apparatus, and when the instruction is received from the reception apparatus, the control section may perform control such that transmission by the first transmission section or transmission by the second transmission section takes place in accordance with the instruction from here onward.

Also, if a communication quality drops to a given quality or less during transmission by the second transmission section, the encoding section may increase the compression ratio of data generated by the generation section.

Also, in a mode of the present invention, the encoding section includes a first encoding section and a second encoding section which is separate from the first encoding section. The first encoding section encodes the data at the time of transmission by the first transmission section, and the second encoding section encodes the data at the time of transmission by the second transmission section. The compression ratio of encoding by the second encoding section is higher than that of the first encoding section.

Also, a transmission apparatus according to the present invention includes a generation section, an encoding section, a first transmission section, and a second transmission section. The generation section generates data. The encoding section encodes the data. The first transmission section can communicate with a reception apparatus. The second transmission section can communicate with the reception apparatus. The transmission apparatus can communicate with the reception apparatus that includes a first reception section, a second reception section, and a decoding section. The first reception section can communicate with the first transmission section. The second reception section can communicate with the second transmission section. The decoding section decodes the encoded data. The first transmission section sends the data generated by the generation section and encoded by the encoding section to the first reception section. The second transmission section sends the data generated by the generation section and encoded by the encoding section to the second reception section. The first transmission section has a higher maximum possible transmission rate than the second transmission section. The encoding section encodes the data at a higher compression ratio at the time of transmission by the second transmission section than the compression ratio at the time of transmission by the first transmission section. The transmission apparatus further includes a control section that controls which data, the data received by the first reception section or the data received by the second reception section, is used by the reception apparatus based on the amount of time from generation of the data by the generation section to when the data is rendered available for use by the reception apparatus.

Also, a reception apparatus according to the present invention can communicate with a transmission apparatus that includes a generation section, an encoding section, a first transmission section, and a second transmission section. The generation section generates data. The encoding section encodes the data. The first transmission section can communicate with the reception apparatus. The second transmission section can communicate with the reception apparatus. The reception apparatus includes a first reception section, a second reception section, and a decoding section. The first reception section can communicate with the first transmission section. The second reception section can communicate with the second transmission section. The decoding section decodes the encoded data. The first transmission section sends the data generated by the generation section and encoded by the encoding section to the first reception section. The second transmission section sends the data generated by the generation section and encoded by the encoding section to the second reception section. The first transmission section has a higher maximum possible transmission rate than the second transmission section. The encoding section encodes the data at a higher compression ratio at the time of transmission by the second transmission section than the compression ratio at the time of transmission by the first transmission section. The reception apparatus further includes a control section that controls which data, the data received by the first reception section or the data received by the second reception section, is used by the reception apparatus based on the amount of time from generation of the data by the generation section to when the data is rendered available for use by the reception apparatus.

Also, a communication system control method according to the present invention is a control method of a communication system that includes a transmission apparatus and a reception apparatus. The transmission apparatus includes a generation section, an encoding section, a first transmission section, and a second transmission section. The generation section generates data. The encoding section encodes the data. The first transmission section can communicate with the reception apparatus. The second transmission section can communicate with the reception apparatus. The reception apparatus includes a first reception section, a second reception section, and a decoding section. The first reception section can communicate with the first transmission section. The second reception section can communicate with the second transmission section. The decoding section decodes the encoded data. The first transmission section sends the data generated by the generation section and encoded by the encoding section to the first reception section. The second transmission section sends the data generated by the generation section and encoded by the encoding section to the second reception section. The first transmission section has a higher maximum possible transmission rate than the second transmission section. The encoding section encodes the data at a higher compression ratio at the time of transmission by the second transmission section than the compression ratio at the time of transmission by the first transmission section. The communication system control method includes the step of controlling which data, the data received by the first reception section or the data received by the second reception section, is used by the reception apparatus based on the amount of time from generation of the data by the generation section to when the data is rendered available for use by the reception apparatus.

Also, a program according to the present invention causes a computer controlling a communication system to perform a procedure. The communication system includes a transmission apparatus and a reception apparatus. The transmission apparatus includes a generation section, an encoding section, a first transmission section, and a second transmission section. The generation section generates data. The encoding section encodes the data. The first transmission section can communicate with the reception apparatus. The second transmission section can communicate with the reception apparatus. The reception apparatus includes a first reception section, a second reception section, and a decoding section. The first reception section can communicate with the first transmission section. The second reception section can communicate with the second transmission section. The decoding section decodes the encoded data. The first transmission section sends the data generated by the generation section and encoded by the encoding section to the first reception section. The second transmission section sends the data generated by the generation section and encoded by the encoding section to the second reception section. The first transmission section has a higher maximum possible transmission rate than the second transmission section. The encoding section encodes the data at a higher compression ratio at the time of transmission by the second transmission section than the compression ratio at the time of transmission by the first transmission section. The program causes the computer to perform the procedure of controlling which data, the data received by the first reception section or the data received by the second reception section, is used by the reception apparatus based on the amount of time from generation of the data by the generation section to when the data is rendered available for use by the reception apparatus.

DESCRIPTION OF EMBODIMENT

A description will be given below of an embodiment of the present invention with reference to drawings.

Figure 1:
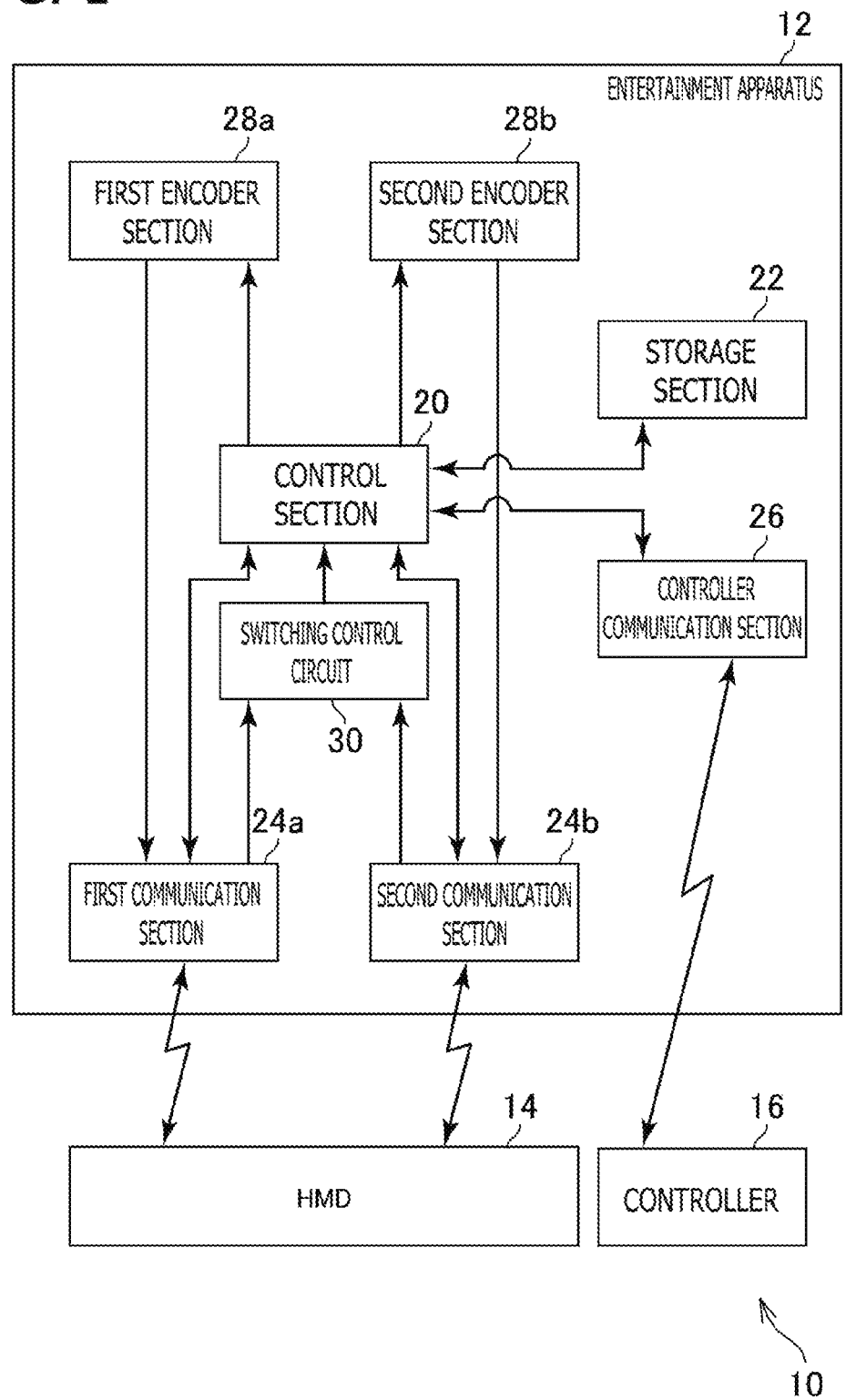
FIG. 1 is a diagram illustrating an example of an overall configuration of an image display system according to an embodiment of the present invention.

FIG. 1 is a diagram illustrating an example of an overall configuration of an image display system 10 according to an embodiment of the present invention.

As illustrated in FIG. 1, the image display system 10 according to the present embodiment includes an entertainment apparatus 12, a head-mounted display (HMD) 14, and a controller 16.

The entertainment apparatus 12 according to the present embodiment is a computer such as game console, digital versatile disc (DVD) player, and Blu-ray (registered trademark) player. In the present embodiment, a video generated by the entertainment apparatus 12 is sent to and displayed on the HMD 14.

As illustrated in FIG. 1, the entertainment apparatus 12 according to the present embodiment includes a control section 20, a storage section 22, a first communication section 24a, a second communication section 24b, a controller communication section 26, a first encoder section 28a, a second encoder section 28b, and a switching control circuit 30.

The control section 20 is a program-controlled device such as central processing unit (CPU) and performs a variety of information processing tasks in accordance with the program stored in the storage section 22. The control section 20 according to the present embodiment also includes a GPU (Graphics Processing Unit) that draws images in a frame buffer based on graphics commands and data supplied from the CPU.

The storage section 22 is, for example, a storage element such as read-only memory (ROM) and random access memory (RAM), a hard disk drive, and so on. The storage section 22 stores programs executed by the control section 20 and so on. Also, the storage section 22 according to the present embodiment has a frame buffer area reserved for drawing of images by the GPU.

The first communication section 24a and the second communication section 24b are, for example, communication interfaces for exchanging data with the HMD 14. The entertainment apparatus 12 according to the present embodiment communicates with the HMD 14 by way of the first communication section 24a or the second communication section 24b.

In the present embodiment, the communication standard for communication handled by the first communication section 24a differs from the communication standard for communication handled by the second communication section 24b. For example, the first communication section 24a engages in communication in the 60 GHz band, and the second communication section 24b engages in communication in the 5 GHz band.

Communication in the 60 GHz band offers a higher maximum possible transmission rate than communication in the 5 GHz band. Also, communication in the 60 GHz band has higher straight line travel property and shorter possible communication distance than communication in the 5 GHz band. In the present embodiment, it is possible to switch between the first communication section 24a and the second communication section 24b for communication with the HMD 14 in accordance with the radio wave condition for wireless communication. Also, in the present embodiment, it is possible to adaptively change the modulation scheme and the coding scheme of the first communication section 24a and the second communication section 24b in accordance with the radio wave condition for wireless communication by using known adaptive modulation and coding technology.

The controller communication section 26 is, for example, a communication interface that communicates with the controller 16 in a wired or wireless fashion.

The first encoder section 28a and the second encoder section 28b are, for example, hardware encoders that encode content data such as video generated by the control section 20 or content data such as video stored in the storage section 22. It should be noted that the first encoder section 28a and the second encoder section 28b are separate in the present embodiment. Also, the first encoder section 28a and the second encoder section 28b may compress content data. In the present embodiment, the compression ratio offered by the second encoder section 28b is higher than the compression ratio offered by the first encoder section 28a.

Also, in the present embodiment, data encoded by the first encoder section 28a is sent to the HMD 14 by the first communication section 24a, and data encoded by the second encoder section 28b is sent to the HMD 14 by the second communication section 24b.

The switching control circuit 30 is a circuit that switches between the first encoder section 28a and the second encoder section 28b for encoding content data.

Figure 2:
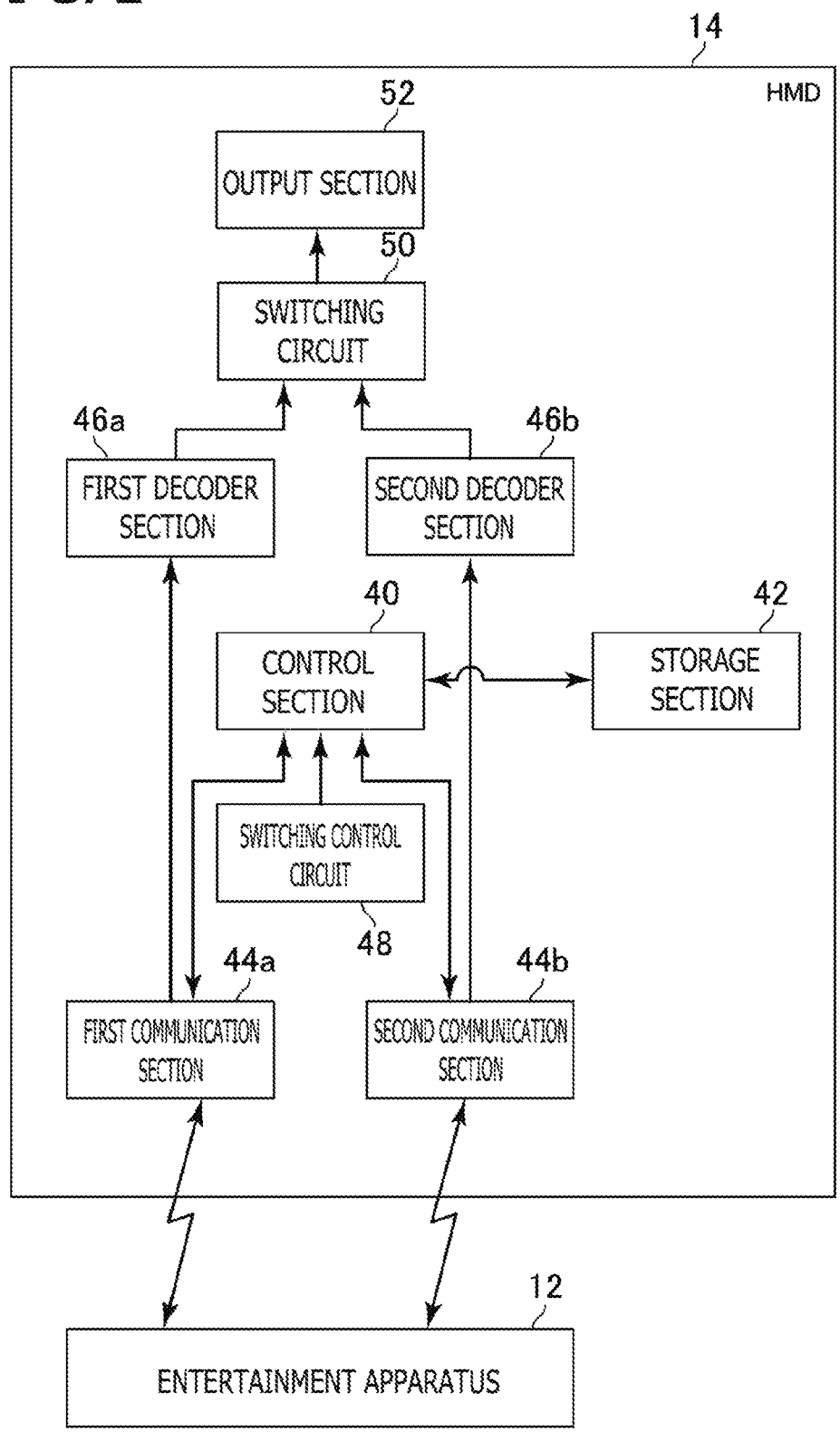
FIG. 2 is a diagram illustrating a configuration example of a head-mounted display according to an embodiment of the present invention.

FIG. 2 is a diagram illustrating a configuration example of the HMD 14 according to the present embodiment.

As illustrated in FIG. 2, the HMD 14 according to the present embodiment includes a control section 40, a storage section 42, a first communication section 44a, a second communication section 44b, a first decoder section 46a, a second decoder section 46b, a switching control circuit 48, a switching circuit 50, and an output section 52.

The control section 40 is a program-controlled device such as CPU and performs a variety of information processing tasks in accordance with the program stored in the storage section 42. The control section 40 according to the present embodiment also includes a GPU (Graphics Processing Unit) that draws images in a frame buffer based on graphics commands and data supplied from the CPU.

The storage section 42 is, for example, a storage element such as ROM and RAM. The storage section 42 stores programs executed by the control section 40 and so on. Also, the storage section 42 according to the present embodiment has a frame buffer area reserved for drawing of images by the GPU.

The first communication section 44a and the second communication section 44b are, for example, communication interfaces for exchanging data with the entertainment apparatus 12. The HMD 14 according to the present embodiment communicates with the entertainment apparatus 12 by way of the first communication section 44a or the second communication section 44b.

In the present embodiment, the communication standard for communication handled by the first communication section 44a differs from the communication standard for communication handled by the second communication section 44b. For example, the first communication section 44a engages in communication in the 60 GHz band, and the second communication section 44b engages in communication in the 5 GHz band.

As described earlier, communication in the 60 GHz band offers a higher maximum possible transmission rate than communication in the 5 GHz band. Also, communication in the 60 GHz band has higher straight line travel property and shorter possible communication distance than communication in the 5 GHz band. In the present embodiment, switching is made between the first communication section 44a and the second communication section 44b for communication with the entertainment apparatus 12 in accordance with the radio wave condition for wireless communication. Also, in the present embodiment, it is possible to adaptively change the modulation scheme and the coding scheme of the first communication section 44a and the second communication section 44b in accordance with the radio wave condition for wireless communication by using known adaptive modulation and coding technology.

In the present embodiment, when the entertainment apparatus 12 and the HMD 14 communicate, communication between the first communication section 24a and the first communication section 44a in the 60 GHz band or communication between the second communication section 24b and the second communication section 44b in the 5 GHz band takes place.

The first encoder section 46a and the second encoder section 46b are, for example, hardware encoders that encode content data received from the entertainment apparatus 12. In the present embodiment, the first encoder section 46a decodes content data received by the first communication section 44a, and the second encoder section 46b decodes content data received by the second communication section 44b. Here, when received content data is compressed data, the first encoder section 46a and the second encoder section 46b decompress the compressed data.

The switching control circuit 48 is, for example, a circuit that switches between the first encoder section 46a and the second encoder section 46b for decoding content data.

The switching circuit 50 is a circuit that switches between whether to display, on the output section 52, the video represented by the data decoded by the first decoder section 46a or the video represented by the data decoded by the second decoder section 46b.

The output section 52 is, for example, a device that displays information as output and produces audio as output. The output section 52 includes, for example, a display section arranged at the front of the HMD 14 such as liquid crystal display or organic electroluminescence (EL) display and an audio output section such as headphone or speaker arranged on the left and right of the HMD 14. The output section 52, for example, displays a video generated by the entertainment apparatus 12 and outputs audio represented by audio data generated by the entertainment apparatus 12. Also, the display section according to the present embodiment can, for example, display a three-dimensional (3D) image by displaying an image for left eye and an image for right eye. It should be noted that the display section may be the one that is not capable of displaying a 3D image and is capable of displaying only a two-dimensional (2D) image.

The controller 16 illustrated in FIG. 1 is an operation input device for making operation input to the entertainment apparatus 12. A user can make a variety of operation inputs with the controller 16 by pressing the directional keys and buttons and tilting operating sticks available on the controller 16. Then, in the present embodiment, the controller 16 outputs input data associated with operation input to the entertainment apparatus 12. The controller 16 according to the present embodiment can communicate with the controller communication section 26 of the entertainment apparatus 12 in a wired or wireless fashion.

In the present embodiment, for example, the entertainment apparatus 12 executes the game program installed in the entertainment apparatus 12. Then, a video generated by the entertainment apparatus 12 in accordance with the play status of the game is displayed on the output section 52 of the HMD 14. The video will be hereinafter referred to as a play video. A play video includes, for example, a plurality of frame images displayed at a given frame rate (e.g., 1/60 second interval).

A description will be given below with focus on a situation in which a play video is displayed on the output section 52 of the HMD 14 in the image display system 10 according to the present embodiment.

In the present embodiment, for example, a play video is sent from the entertainment apparatus 12 to the HWD 14 in units of a partial video which is part of the play video. It should be noted that the plurality of partial videos making up the play video may be the same or different in size.

Figure 3:
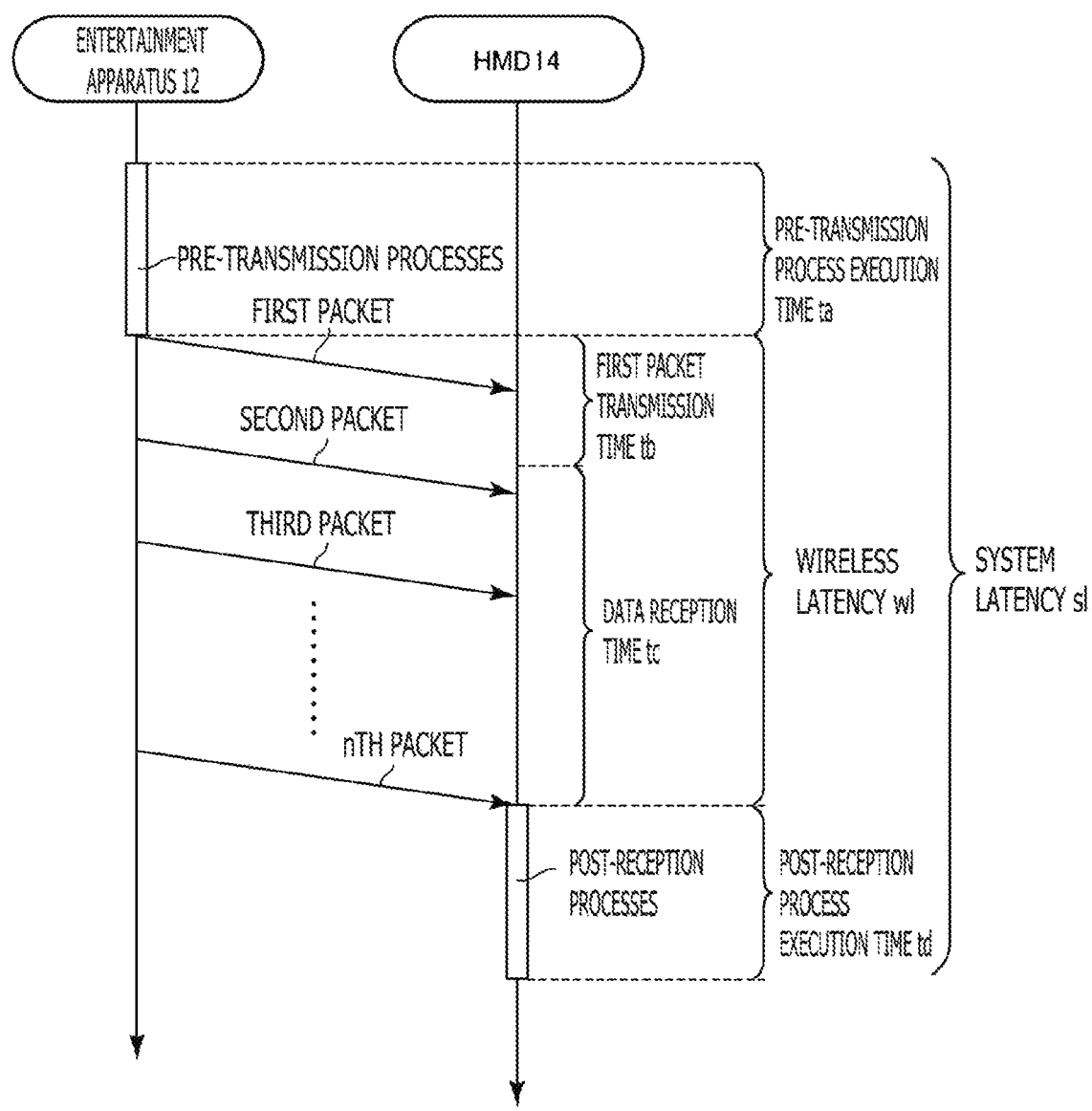
FIG. 3 is an explanatory diagram schematically illustrating an example of transmission of a partial video.

FIG. 3 is an explanatory diagram schematically illustrating an example of transmission of a partial video. An example of transmission of a partial video will be described below with reference to FIG. 3.

In the present embodiment, partial video data is divided into a plurality of packets of a size appropriate for encoding, and pre-transmission processes such as encoding, data transport, and stacking are performed on the plurality of divided packets. Hereinafter, n packets generated by dividing partial video data generated by the entertainment apparatus 12 will be referred to as a first packet, a second packet, a third packet, and so on up to an nth packet.

The plurality of packets subjected to the pre-transmission processes is successively sent from the entertainment apparatus 12 to the HMD 14.

After receiving the plurality of packets, the HMD 14 performs post-reception processes such as data transport, stacking, and decoding on the plurality of packets. As a result of execution of the post-reception processes, the partial video data generated by the entertainment apparatus 12 is rendered available for use by the HMD 14. In the present embodiment, the video represented by partial video data rendered available for use as described above is displayed on the output section 52 of the HMD 14.

The details of the video represented by partial video data rendered available for use by the HMD 14 are the same as those of the partial video generated by the entertainment apparatus 12. However, there is no need for partial video data rendered available for use by the HMD 14 to be the same as partial video data generated by the entertainment apparatus 12. For example, if partial video data is irreversibly compressed during encoding in the entertainment apparatus 12, partial video data rendered available for use by the HMD 14 is not completely the same as partial video data generated by the entertainment apparatus 12.

Hereinafter, time required for pre-transmission processes will be referred to as a pre-transmission process execution time ta as illustrated in FIG. 3. Also, time from transmission of the first packet by the entertainment apparatus 12 to reception thereof by the HMD 14 will be referred to as a first packet transmission time tb. Also, time from reception of the first packet by the HMD 14 to reception of the second, third, and so on up to the nth packet will be referred to as a data reception time tc. Also, the sum of the first packet transmission time tb and the data reception time tc will be referred to as a wireless latency wl. Also, time required for post-reception processes will be referred to as a post-reception process execution time td. Also, the sum of the pre-transmission process execution time ta, the wireless latency wl, and the post-reception process execution time td will be referred to as a system latency sl. That is, time from generation of partial video data by the entertainment apparatus 12 to when the data is rendered available for use by the HMD 14 is equivalent to the system latency sl.

In play video communication through wireless communication as in the present embodiment, it is important to shorten the system latency sl in order to reduce the sense of discomfort felt by the player during game operation. For example, the system latency sl is required to be a given time th_sl or less (e.g., ½ vertical synchronization (VSYNC) or less).

Here, for example, the higher the data encoding compression ratio, the longer time is required for encoding and decoding. This leads to the long pre-transmission process execution time and the long post-reception process execution time td. On the other hand, the higher the data encoding compression ratio, the shorter time is required to send data. For this reason, the higher the data encoding compression ratio, the shorter the wireless latency wl.

Also, communication in the 60 GHz band offers a higher maximum possible transmission rate than communication in the 5 GHz band. In a favorable communication condition, therefore, it is highly likely that the system latency sl remains at the given time th_sl or less even without increasing the encoding compression ratio in communication in the 60 GHz band.

However, communication in the 60 GHz band has higher straight line travel property and shorter possible communication distance than communication in the 5 GHz band. For this reason, in the presence of an obstacle between the entertainment apparatus 12 and the HMD 14 or if there is a long distance between the entertainment apparatus 12 and the HMD 14, this may lead to an increased retry count. As a result, the system latency sl may not remain at the given time th_sl or less in communication in the 60 GHz band depending on the communication condition.

Thus, various situations such as compression ratio and communication condition affect the system latency sl. Then, in play video communication through wireless communication, for example, an appropriate communication path is preferably selected in accordance with the above system latency sl so that the system latency sl is kept, for example, to the given time th_sl or less. In prior arts, however, the selection of a communication path in accordance with the system latency sl has not been made.

In the present embodiment, which data, data received by the first communication section 44a or data received by the second communication section 44b, is used by the HMD 14 is controlled based on the above system latency sl. According to the present embodiment, therefore, an appropriate communication path is selected in accordance with the above system latency sl.

A description will be given below of functions of the image display system 10 according to the present embodiment and processes performed by the image display system 10 according to the present embodiment with focus on the selection of a communication path in accordance with the system latency sl. It should be noted that the image display system 10 according to the present embodiment serves as a communication system whose communication path is controlled in accordance with the system latency sl.

Figure 4:
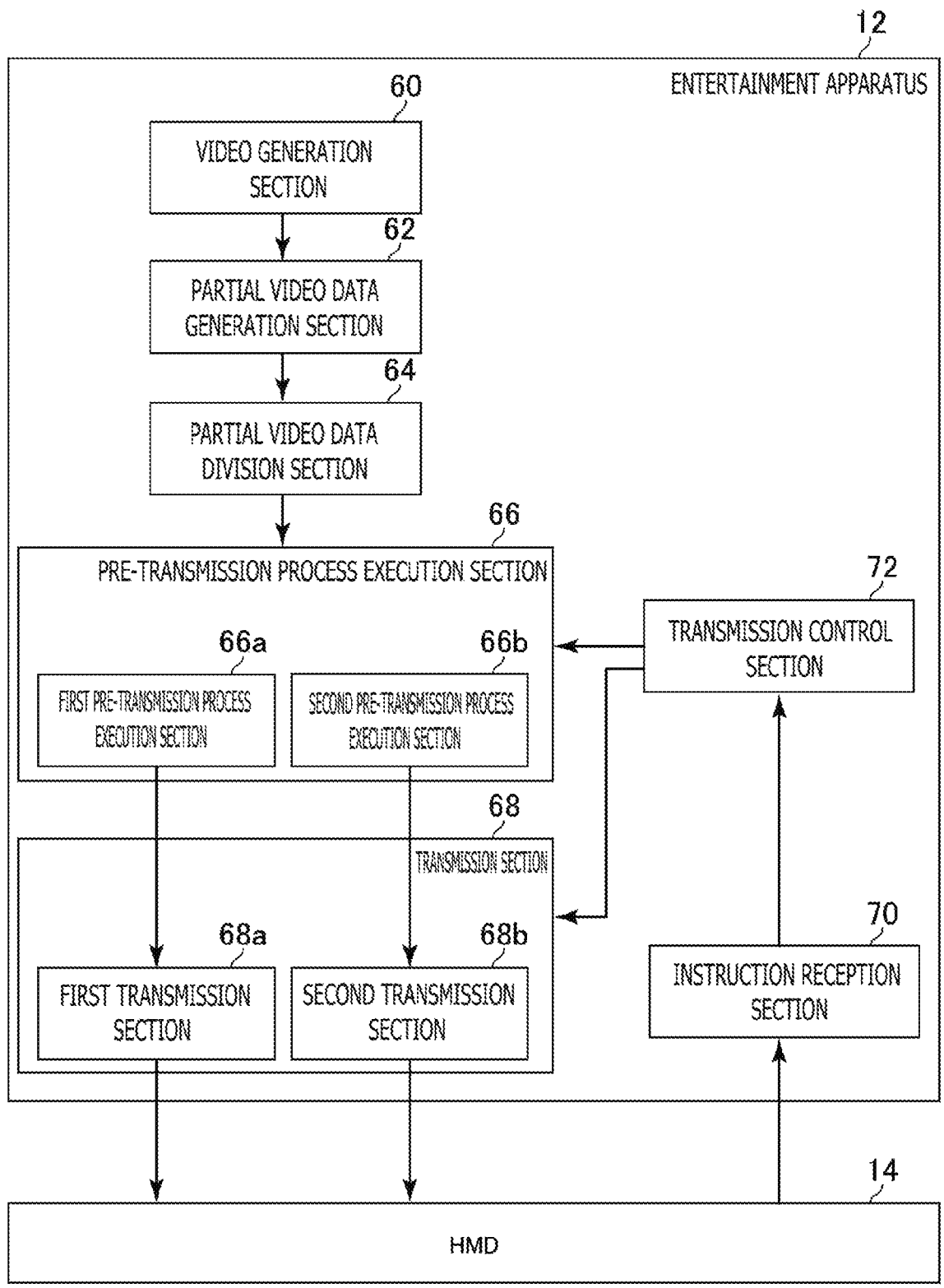
FIG. 4 is a functional block diagram illustrating examples of functions implemented in an entertainment apparatus according to an embodiment of the present invention.

FIG. 4 is a functional block diagram illustrating examples of functions implemented in the entertainment apparatus 12 according to the present embodiment. It should be noted that there is no need to implement all the functions depicted in FIG. 4 in the entertainment apparatus 12 according to the present embodiment and that functions other than those depicted in FIG. 4 may be implemented.

As illustrated in FIG. 4, the entertainment apparatus 12 according to the present embodiment functionally includes, for example, a video generation section 60, a partial video data generation section 62, a partial video data division section 64, a pre-transmission process execution section 66, a transmission section 68, an instruction reception section 70, and a transmission control section 72. Also, the pre-transmission process execution section 66 includes a first pre-transmission process execution section 66a and a second pre-transmission process execution section 66b. Also, the transmission section 68 includes a first transmission section 68a and a second transmission section 68b. The video generation section 60, the partial video data generation section 62, and the partial video data division section 64 are primarily implemented as the control section 20. The first pre-transmission process execution section 66a is primarily implemented as the first communication section 24a and the first encoder section 28a. The second pre-transmission process execution section 66b is primarily implemented as the second communication section 24b and the second encoder section 28b. The first transmission section 68a is primarily implemented as the first communication section 24a. The second transmission section 68b is primarily implemented as the second communication section 24b. The instruction reception section 70 is primarily implemented as the first communication section 24a and the second communication section 24b. The transmission control section 72 is primarily implemented as the control section 20 and the switching control circuit 30. The entertainment apparatus 12 according to the present embodiment serves as a transmission apparatus whose communication path is controlled in accordance with the system latency sl.

The above functions may be implemented as a result of execution of a program including instructions for the above functions by the control section 20. This program is supplied to the entertainment apparatus 12, for example, via a computer-readable information storage media such as optical disc, magnetic disk, magnetic tape, magneto-optical disk, and flash memory. Alternatively, the program is supplied to the entertainment apparatus 12 via the Internet and so on.

Figure 5:
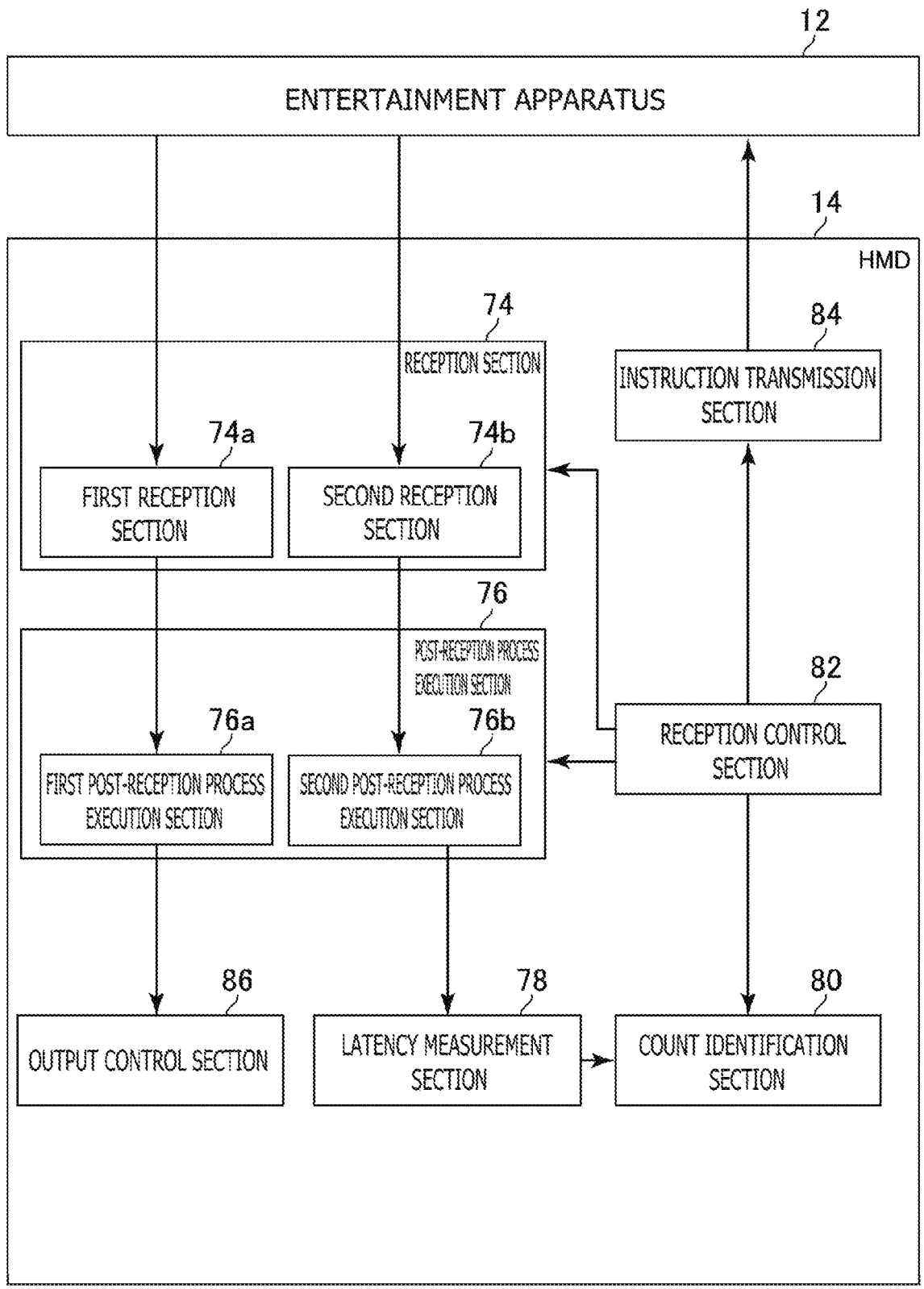
FIG. 5 is a functional block diagram illustrating examples of functions implemented in a head-mounted display according to an embodiment of the present invention.

FIG. 5 is a functional block diagram illustrating examples of functions implemented in the head-mounted display 14 according to the embodiment of the present invention. It should be noted that there is no need to implement all the functions depicted in FIG. 5 in the HMD 14 according to the present embodiment and that functions other than those depicted in FIG. 5 may be implemented.

As illustrated in FIG. 5, the HMD 14 according to the present embodiment functionally includes, for example, a reception section 74, a post-reception process execution section 76, a latency measurement section 78, a count identification section 80, a reception control section 82, an instruction transmission section 84, and an output control section 86. Also, the reception section 74 includes a first reception section 74a and a second reception section 74b. Also, the post-reception process execution section 76 includes a first post-reception process execution section 76a and a second post-reception process execution section 76b. The first reception section 74a is primarily implemented as the first communication section 44a. The second reception section 74b is primarily implemented as the second communication section 44b. The first post-reception process execution section 76a is primarily implemented as the first communication section 44a and the first decoder section 46a. The second post-reception process execution section 76b is primarily implemented as the second communication section 44b and the second decoder section 46b. The latency measurement section 78 and the count identification section 80 are primarily implemented as the control section 40. The reception control section 82 is primarily implemented as the control section 40, the switching control circuit 48, and the switching circuit 50. The instruction transmission section 84 is primarily implemented as the first communication section 44a and the second communication section 44b. The output control section 86 is primarily implemented as the control section 40 and the output section 52. The HMD 14 according to the present embodiment serves as a reception apparatus whose communication path is controlled in accordance with the system latency sl.

The above functions may be implemented as a result of execution of a program including instructions for the above functions by the control section 40. This program is supplied to the HMD 14, for example, via a computer-readable information storage media such as optical disc, magnetic disk, magnetic tape, magneto-optical disk, and flash memory. Alternatively, the program is supplied to the HMD 14 via the Internet and so on.

The video generation section 60 generates, for example, videos such as play videos described above in the present embodiment.

The partial video data generation section 62 generates, for example, partial video data, part of a video generated by the video generation section 60 in the present embodiment.

The partial video data division section 64 divides, for example, partial video data generated by the partial video data generation section 62 in the present embodiment. The partial video data division section 64 generates, for example, n packets, namely, a first packet, a second packet, a third packet, and so on up to an nth packet.

The pre-transmission process execution section 66 performs the above pre-transmission processes, for example, on data generated by the video generation section 60 in the present embodiment. The pre-transmission process execution section 66 performs the above pre-transmission processes, for example, on each packet generated by the partial video data division section 64 in the present embodiment. The pre-transmission processes include an encoding process as described above. Also, the encoding process may include a compression process.

The transmission section 68 sends, for example, data subjected to encoding or other pre-transmission processes by the pre-transmission process execution section 66 to the reception section 74 in the present embodiment.

The instruction reception section 70 receives, for example, an instruction, either transmission by the first transmission section 68a or transmission by the second transmission section 68b, from the instruction transmission section 84 of the HMD 14 in the present embodiment.

The transmission control section 72 controls, for example, whether transmission by the first transmission section 68a or transmission by the second transmission section 68b takes place based on the system latency sl in the present embodiment. When the instruction reception section 70 receives the above instruction from the HMD 14, the transmission control section 72 may perform control such that transmission by the first transmission section 68a or transmission by the second transmission section 68b takes place in accordance with the instruction from here onward.

Also, in the present embodiment, the transmission control section 72 retains transmission section identification data that manages whether transmission by the first transmission section 68a or transmission by the second transmission section 68b takes place. For example, when transmission by the first transmission section 68a takes place, the transmission section identification data value is set to "1," and when transmission by the second transmission section 68b takes place, the transmission section identification data value is set to "2." It should be noted that when the transmission section identification data value is set to "1," the transmission control section 72 may perform control such that the second communication section 24b is halted. Also, when the transmission section identification data value is set to "2," the transmission control section 72 may perform control such that the first communication section 24a is halted.

Also, we assume, for example, that the number of times the system latency sl exceeds the given time th_sl reaches a given count when transmission by the second transmission section 68b does not take place, but transmission by the first transmission section 68a takes place. In this case, for example, the transmission control section 72 may perform control such that transmission by the second transmission section 68b takes place rather than transmission by the first transmission section 68a from here onward.

Also, in the present embodiment, the transmission control section 72 retains an MCS (modulation and coding scheme) value (index number) that indicates the modulation scheme and the coding scheme used for communication. It should be noted that the correspondence between the MCS value and the combination of the modulation scheme and the coding scheme varies depending on the communication standard. For this reason, the modulation scheme and the coding scheme associated with a certain MCS value for communication in the 60 GHz band by the first transmission section 68a differs from the modulation scheme and the coding scheme associated with that value for communication in the 5 GHz band by the second transmission section 68b.

In the present embodiment, for example, when the transmission control section 72 performs control such that transmission by the first transmission section 68a takes place, the first transmission section 68a sends packets. Also, when the transmission control section 72 performs control such that transmission by the second transmission section 68b takes place, the second transmission section 68b sends packets.

Also, in the present embodiment, for example, when transmission by the second transmission section 68b takes place, the pre-transmission process execution section 66 encodes data at a higher compression ratio than in transmission by the first transmission section 68a. In the present embodiment, for example, when the transmission control section 72 performs control such that transmission by the first transmission section 68a takes place, the first pre-transmission process execution section 66a performs the pre-transmission processes. Also, when the transmission control section 72 performs control such that transmission by the second transmission section 68b takes place, the second pre-transmission process execution section 66b performs the pre-transmission processes. Also, in the present embodiment, the encoding compression ratio of the second pre-transmission process execution section 66b is higher than the encoding compression ratio by the first pre-transmission process execution section 66a.

Also, if a communication quality drops to a given quality or less during transmission by the second transmission section 68b, the pre-transmission process execution section 66 may increase the compression ratio of data generated by the video generation section 60. This ensures that a smaller amount of data is associated with a frame image, keeping the increase in the system latency sl caused by degraded communication quality to a minimum.

The reception section 74 receives, for example, data sent from the transmission section 68 in the present embodiment.

The post-reception process execution section 76 performs, for example, the above post-reception processes on data received by the reception section 74 in the present embodiment.

The latency measurement section 78 measures, for example, the system latency sl described above in the present embodiment. In the present embodiment, we assume, for example, that the system clocks are synchronous between the entertainment apparatus 12 and the HMD 14. Then, the pre-transmission process execution section 66 attaches, to each of the above n packets, data representing a timestamp when the execution of the above pre-transmission processes begins. This makes it possible, for example, for the latency measurement section 78 to measure the amount of time from the time indicated by the data representing the timestamp attached to the n packets to the time when the post-reception processes end for the n packets as the system latency sl.

The count identification section 80 identifies the number of times the system latency sl exceeds the given time th_sl. In the present embodiment, we assume that the count identification section 80 retains latency over count data indicating the number of times the system latency sl exceeds the given time th_sl. The initial value for a latency over count data value c is 0. Then, if the system latency sl exceeds the given time th_sl, the count identification section 80 increments the latency over count data value c by 1.

In the present embodiment, the reception control section 82 controls, for example, which data, data received by the first communication section 74a or data received by the second communication section 74b, is used by the HMD 14 based on the system latency sl.

Also, in the present embodiment, the reception control section 82 retains reception section identification data that manages whether data received by the first reception section 74a or data received by the second reception section 74b is used by the HMD 14. For example, when data received by the first reception section 74a is used by the HMD 14, the reception section identification data value is set to "1," and when data received by the second reception section 74b is used by the HMD 14, the reception section identification data value is set to "2." It should be noted that when the reception section identification data value is set to "1," the reception control section 82 may perform control such that the second communication section 44b is halted. Also, when the reception section identification data value is set to "2," the reception control section 82 may perform control such that the first communication section 44a is halted.

Also, in the present embodiment, the reception control section 82 retains an MCS value (index number) that indicates the modulation scheme and the coding scheme used for communication. It should be noted that, as described above, the modulation scheme and the coding scheme associated with a certain MCS value for communication in the 60 GHz band by the first reception section 74a differs from the modulation scheme and the coding scheme associated with that value for communication in the 5 GHz band by the second reception section 74b.

In the present embodiment, for example, when the reception control section 82 performs control such that data received by the first reception section 74a is used by the HMD 14, the first reception section 74a receives data. Also, when the reception control section 82 performs control such that data received by the second reception section 74b is used by the HMD 14, the second reception section 74b receives data.

In the present embodiment, for example, when the reception control section 82 performs control such that data received by the first reception section 74a is used by the HMD 14, the first post-reception process execution section 76a performs the post-reception processes. Also, when the reception control section 82 performs control such that data received by the second reception section 74b is used by the HMD 14, the second post-reception process execution section 76b performs the post-reception processes.

It should be noted that, in the present embodiment, when the transmission control section 72 performs control such that transmission by the first transmission section 68a takes place, the HMD 14 uses data received by the first reception section 74a as a result. Also, when the transmission control section 72 performs control such that transmission by the second transmission section 68b takes place, the HMD 14 uses data received by the second reception section 74b as a result. For this reason, it can be said that the transmission control section 72 serves as a control section that controls which data, data received by the first communication section 74a or data received by the second communication section 74b, is used by the HMD 14 based on the system latency sl.

The instruction transmission section 84 instructs the entertainment apparatus 12 as to whether transmission by the first transmission section 68a or transmission by the second transmission section 68b should take place based on the system latency sl. In the present embodiment, for example, the instruction transmission section 84 sends, to the instruction reception section 70, an instruction as to whether transmission by the first transmission section 68a or transmission by the second transmission section 68b should take place based on the system latency sl.

The output control section 86 performs control such that data already subjected to the post-reception processes by the post-reception process execution section 76 is output. In the present embodiment, for example, the output control section 86 displays the video represented by data already subjected to the post-reception processes on the output section 52 as output.

A description will be given below of an example of a processing flow performed by the image display system 10 according to the present embodiment.

It should be noted that we assume in the description given below that, as described earlier, the system clocks are synchronous between the entertainment apparatus 12 and the HMD 14 according to the present embodiment.

Also, we assume as a premise that the entertainment apparatus 12 according to the present embodiment switches, by using known technology, between the first communication section 24a and the second communication section 24b for communication with the HMD 14 in accordance with the radio wave condition for wireless communication. We also assume that the HMD 14 according to the present embodiment switches, by using known technology, between the first communication section 44a and the second communication section 44b for communication with the entertainment apparatus 12 in accordance with the radio wave condition for wireless communication.

Also, we assume as a premise that the entertainment apparatus 12 according to the present embodiment adaptively changes, by using known adaptive modulation and coding technology, the modulation scheme and the coding scheme of the first communication section 24a and the second communication section 24b in accordance with the radio wave condition for wireless communication. Also, we assume that the HMD 14 according to the present embodiment adaptively changes, by using known adaptive modulation and coding technology, the modulation scheme and the coding scheme of the first communication section 44a and the second communication section 44b in accordance with the radio wave condition for wireless communication.

Also, we assume that communication in a single carrier scheme takes place in communication in the 60 GHz band. In communication in the 5 GHz band, 4×4 MIMO (multiple-input and multiple-output) communication compliant with the 802.11ac standard takes place in 80 MHz bandwidth. Also, we assume, in adaptive modulation coding in the present embodiment, that the modulation scheme and the coding scheme change with change in the MCS (modulation and coding scheme) value (index number).

Figure 6:
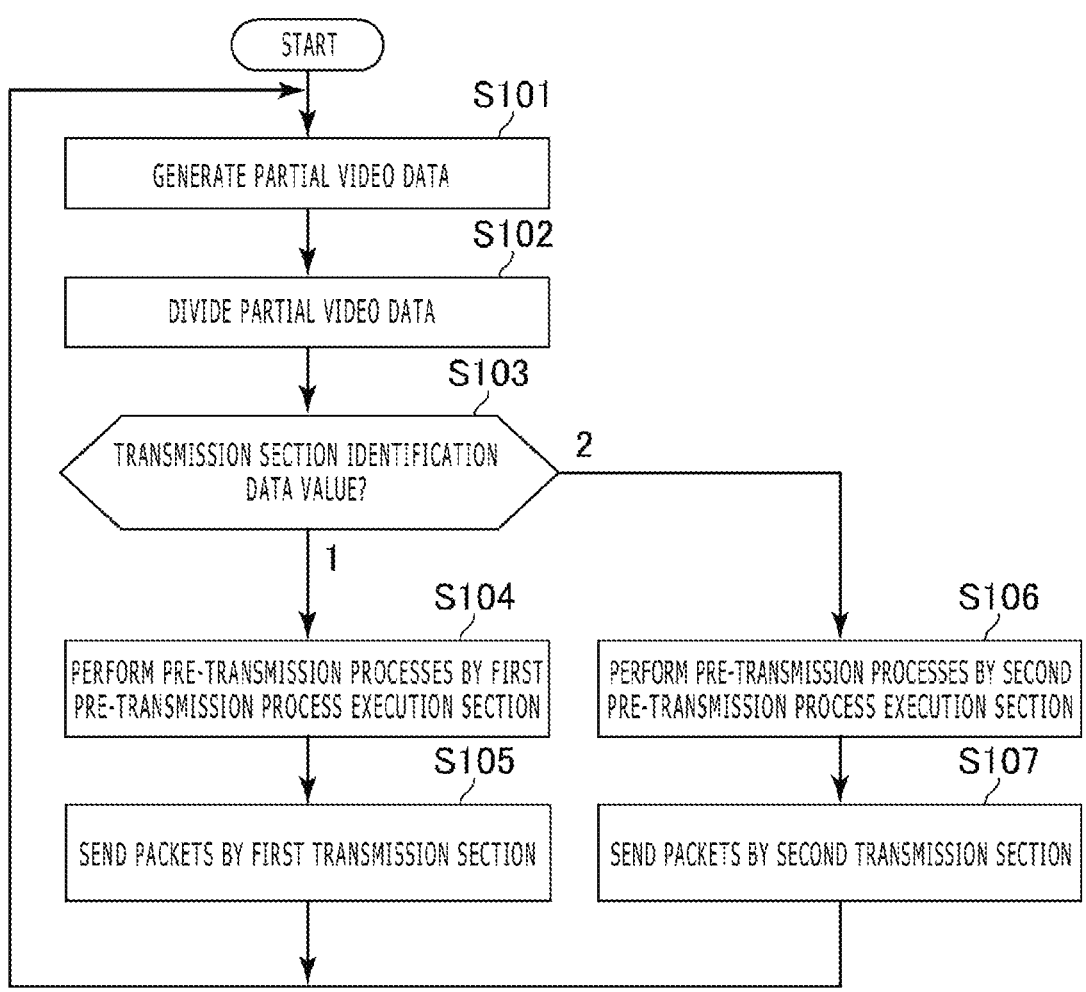
FIG. 6 is a flowchart illustrating an example of a processing flow performed by the entertainment apparatus according to an embodiment of the present invention.

A description will be given first of an example of a packet transmission processing flow performed by the entertainment apparatus 12 according to the present embodiment with reference to the flowchart depicted in FIG. 6.

First, the partial video data generation section 62 generates partial video data, part of a video generated by the video generation section 60 (S101). Then, the partial video data division section 64 generates a plurality of packets (first to nth packets) by dividing the partial video data generated in the process depicted in S101 (S102). Then, the transmission control section 72 confirms the retained transmission section identification data value (S103).

When the value confirmed in the process depicted in S103 is "1," the first pre-transmission process execution section 66a performs the pre-transmission processes on the packets generated in the process depicted in S102 (S104). Then, the first transmission section 68a sends, to the HMD 14, the plurality of packets subjected to the pre-transmission processes in the process depicted in S104 (S105).

When the value confirmed in the process depicted in S103 is "2," the second pre-transmission process execution section 66b performs the pre-transmission processes on the packets generated in the process depicted in S102 (S106). Then, the second transmission section 68b sends, to the HMD 14, the plurality of packets subjected to the pre-transmission processes in the process depicted in S106 (S107).

When the process depicted in S105 or the process depicted in S107 ends, control returns to the process depicted in S101, and the processes from S101 to S107 will be repeated from here onward.

It should be noted that the process depicted in S104 includes encoding as described above. Also, the encoding process may include a compression process. Also, as described above, the process depicted in S104 also includes a process of attaching, to each of the above n packets generated in the process depicted in S102, data representing a timestamp when the execution of the above pre-transmission processes begins.

A description will be given next of an example of a processing flow performed by the HMD 14 according to the present embodiment in response to reception of the plurality of packets sent in the processes depicted in S105 and S107 described above with reference to the flowcharts depicted in FIGS. 7A and 7B.

First, the reception control section 82 confirms the retained reception section identification data value (S201). When the value confirmed in the process depicted in S201 is "1," the first post-reception process execution section 76a performs the post-reception processes on the packets received by the first reception section 74a (S202). When the value confirmed in the process depicted in S201 is "2," the second post-reception process execution section 76b performs the post-reception processes on the packets received by the second reception section 74b (S203).

Then, after the process depicted in S202 or S203 ends, the output control section 86 displays the play video represented by the data subjected to the post-reception processes in the process depicted in S203 on the output section 52 (S204).

Then, the latency measurement section 78 identifies the system latency sl as described above based on the data subjected to the post-reception processes in the process depicted in S202 or S203 (S205).

Then, the count identification section 80 confirms whether or not the system latency sl identified in the process depicted in S205 exceeds the given time th_sl (S206). Then, when it is confirmed that the identified system latency sl exceeds the given time th_sl (S206: Y), the count identification section 80 increments the retained latency over count data value c by 1 (S207).

When it is confirmed that the identified system latency sl does not exceed the given time th_sl (S206: N) or when the process depicted in S207 ends, the reception control section 82 confirms the retained reception section identification data value (S208).

When it is confirmed that the reception section identification data value is "1," the reception control section 82 confirms the retained MCS value (S209). When the confirmed MCS value is not less than 8 (equivalent to not less than 2310 Mbps), the processes depicted in the present processing example are terminated.

When the confirmed MCS value is not less than 4 and not more than 7 (equivalent to not less than 1155 Mbps and not more than 1925 Mbps), the reception control section 82 confirms whether or not the latency over count data value c retained by the count identification section 80 is equal to a given threshold th_c or more (S210).

When the retained latency over count data value c is not equal to the given threshold th_c or more (S210: N), the processes depicted in the present processing example are terminated. When the retained latency over count data value c is equal to the given threshold th_c or more (S210: Y), the count identification section 80 changes the retained latency over count data value c to 0 (S211).

After the process depicted in S211 ends or when the MCS value confirmed in the process depicted in S209 is 3 (equivalent to 962.5 Mbps), the reception control section 82 changes the retained reception section identification data value to "2" (S212). It should be noted that the reception control section 82 may activate the second communication section 44b and halt the first communication section 44a in the process depicted in S212. Then, the instruction transmission section 84 sends, to the entertainment apparatus 12, an instruction for causing transmission by the second transmission section 68*b* to take place (S213), thereby terminating the processes depicted in the present processing example.

When it is confirmed that the reception section identification data value is "2," in the process depicted in S208, the reception control section 82 confirms the retained MCS value (S214). When the confirmed MCS value is not more than 7 (equivalent to not more than 1560 Mbps), the reception control section 82 confirms whether or not the latency over count data value c retained by the count identification section 80 is equal to the given threshold th_c or more (S215).

When the retained latency over count data value c is equal to the given threshold th_c or more (S215: Y), the count identification section 80 changes the retained latency over count data value c to 0 (S216), and the reception control section 82 decrements the retained MCS value c by 1 (S217). Then, the instruction transmission section 84 sends, to the entertainment apparatus 12, an instruction for decrementing the MCS value by 1 (S218). In this case, communication will take place using the modulation scheme and the coding scheme indicated by the decremented MCS value from here onward.

When it is confirmed that the latency over count data value c retained by the process depicted in S215 is not equal to the given threshold th_c or more (S215: N), the reception control section 82 confirms whether or not the retained MCS value is 4 (equivalent to 780 Mbps) (S219). When the process depicted in S218 ends, the reception control section 82 also confirms whether or not the retained MCS value is 4 (equivalent to 780 Mbps) (S219).

When it is confirmed that the retained MCS value is not 4 (S219: N), the processes depicted in the present processing example are terminated. When it is confirmed that the retained MCS value is 4 (S219: Y), it is confirmed whether or not an index value i representing the communication quality (e.g., signal-to-noise ratio (S/N ratio) and reception intensity) is smaller than a given threshold th_i (S220). Here, for example, a value obtained by adding a given buffer value to the index value when the MCS value changes from 4 to 3 in adaptive modulation coding may be used. When it is confirmed that the value i is not smaller than the threshold th_i (S220: N), the processes depicted in the present processing example are terminated. When it is confirmed that the value i is smaller than the threshold th_i (S220: Y), the instruction transmission section 84 sends, to the entertainment apparatus 12, an instruction for increasing the encoding compression ratio of the second pre-transmission process execution section 66*b* by a given amount (S221).

When the MCS value confirmed by the process depicted in S214 is not less than 8 (equivalent to not less than 1560 Mbps), the reception control section 82 changes the retained reception section identification data value to "1" (S222). It should be noted that the reception control section 82 may activate the first communication section 44*a* and halt the second communication section 44*b* in the process depicted in S222. Then, the instruction transmission section 84 sends, to the entertainment apparatus 12, an instruction for causing transmission by the first transmission section 68*a* to take place (S223), thereby terminating the processes depicted in the present processing example.

We assume that the instruction reception section 70 of the entertainment apparatus 12 receives the instruction for causing transmission by the second transmission section 68*b* to take place which is an instruction sent in the process depicted in S213 described above. In this case, the transmission control section 72 changes the retained transmission section identification data value to "2." Here, the transmission control section 72 may activate the second communication section 24*b* and halt the first communication section 24*a*.

We assume that the instruction reception section 70 of the entertainment apparatus 12 receives the instruction for decrementing the MCS value by 1 which is an instruction sent in the process depicted in S218 described above. In this case, the transmission control section 72 decrements the retained MCS value by 1. In this case, communication will take place using the modulation scheme and the coding scheme indicated by the decremented MCS value from here onward.

We assume that the instruction reception section 70 of the entertainment apparatus 12 receives the instruction for increasing the encoding compression ratio of the second pre-transmission process execution section 66*b* by a given amount which is an instruction sent in the process depicted in S221 described above. In this case, the transmission control section 72 increases the encoding compression ratio of the second pre-transmission process execution section 66*b* by a given amount.

We assume that the instruction reception section 70 of the entertainment apparatus 12 receives the instruction for causing transmission by the first transmission section 68*a* to take place which is an instruction sent in the process depicted in S223 described above. In this case, the transmission control section 72 changes the retained transmission section identification data value to "2." Here, the transmission control section 72 may activate the first communication section 24*a* and halt the second communication section 24*b*.

Figure 7A:
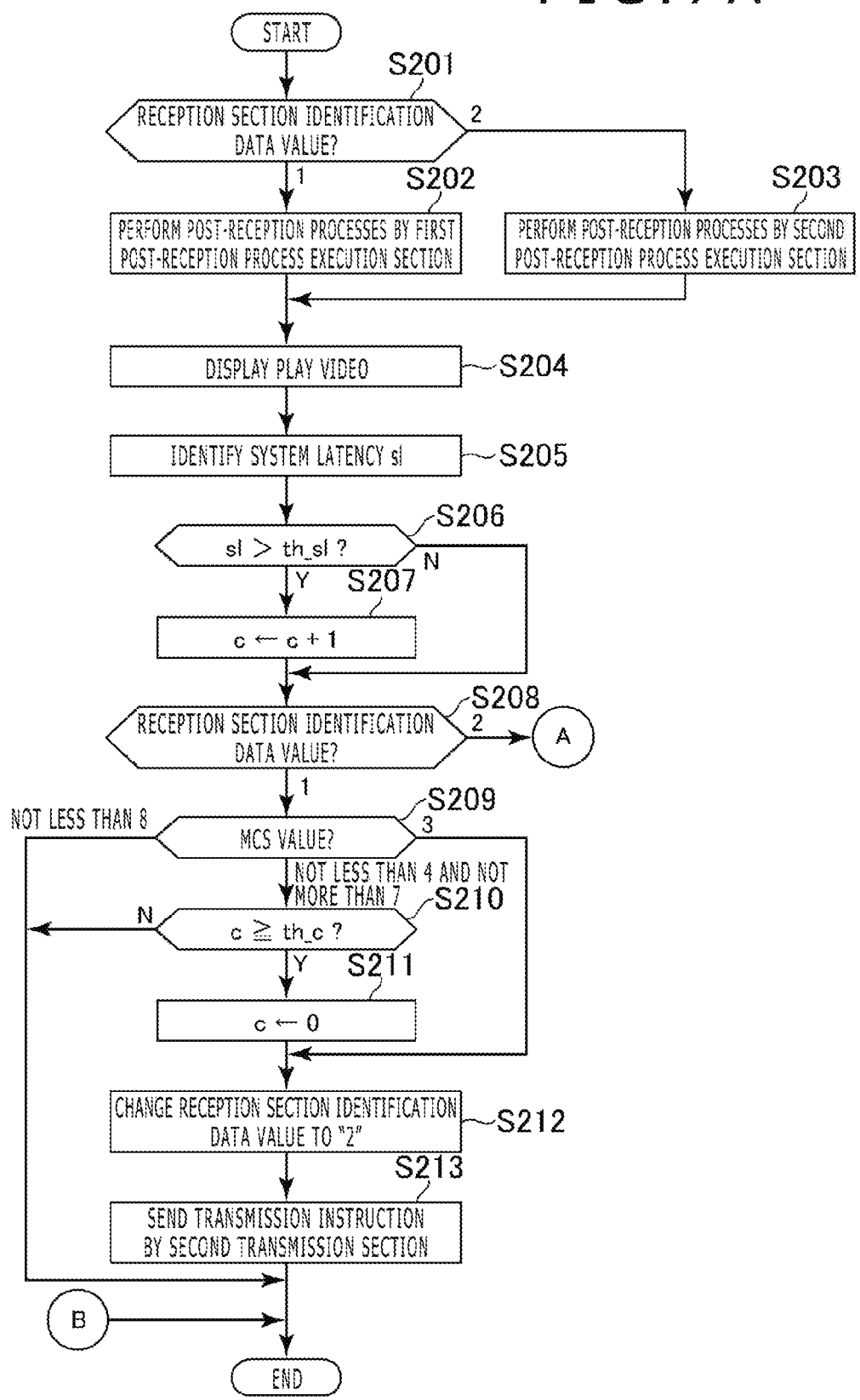
FIG. 7A is a flowchart illustrating an example of a processing flow performed by the head-mounted display according to an embodiment of the present invention.
Figure 7B:
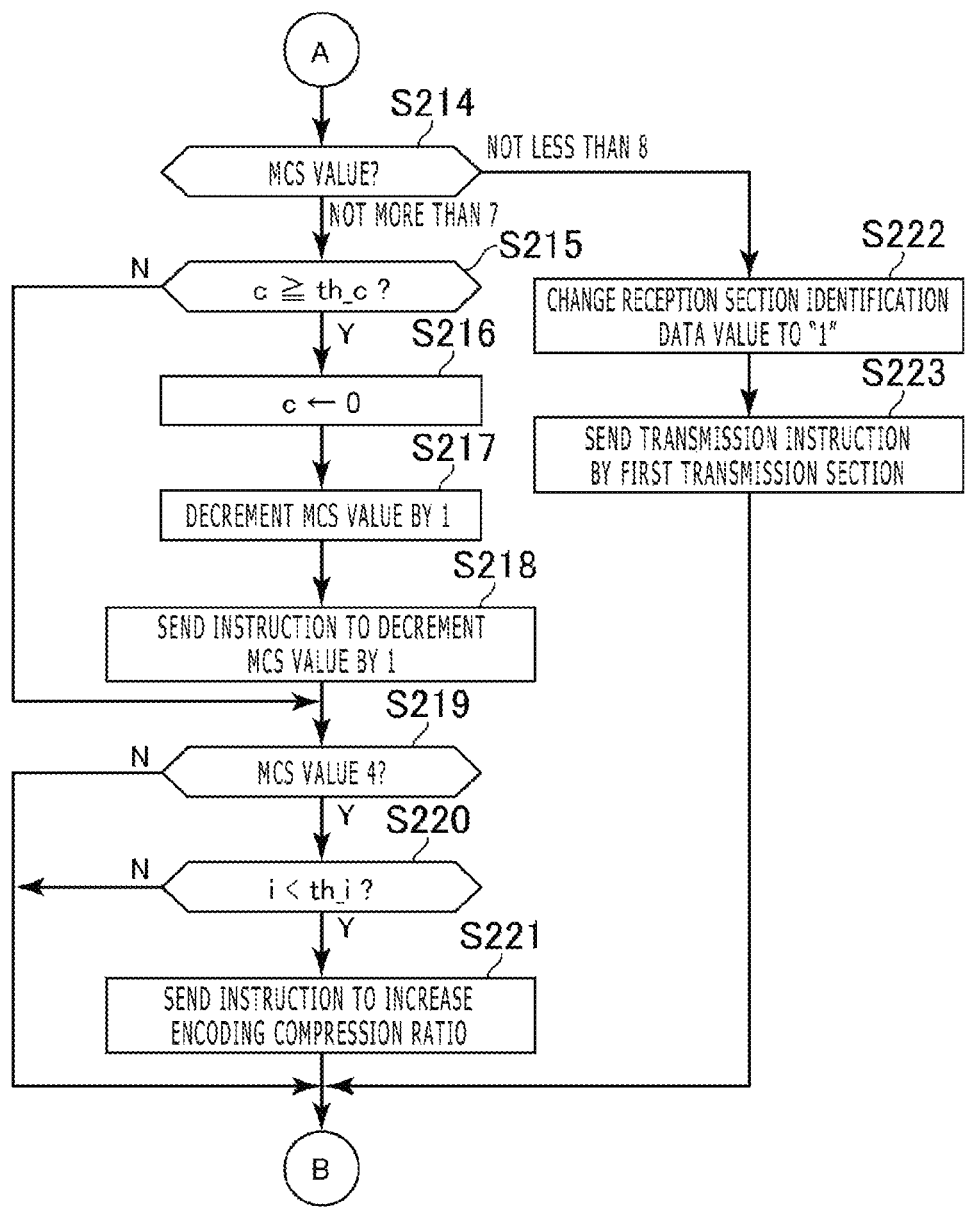
FIG. 7B is a flowchart illustrating an example of a processing flow performed by the head-mounted display according to an embodiment of the present invention.

It should be noted that when, in the processing examples depicted in FIGS. 7A and 7B, the reception control section 82 changes the retained reception section identification data value as depicted, for example, in S212 and S222, the count identification section 80 may change the retained latency over count data value c to 0. Also, when switching is made between the first communication section 24*a* and the second communication section 24*b* for communication with the HMD 14 in accordance with the radio wave condition for wireless communication, the count identification section 80 may change the retained latency over count data value c to 0. Also, when switching is made between the first communication section 44*a* and the second communication section 44*b* for communication with the entertainment apparatus 12 in accordance with the radio wave condition for wireless communication, the count identification section 80 may change the retained latency over count data value c to 0.

It should be noted that the present invention is not limited to the embodiment described above.

For example, certain data may be encoded by the first encoder section 28*a* first followed by transmission to the HMD 14 by the first communication section 24*a*, and a copy of the data may be encoded by the second encoder section 28*b* first followed by transmission to the HMD 14 by the second communication section 24*b*. Here, the compression ratio of encoding by the second encoder section 28*b* may be higher than the compression ratio of encoding by the first encoder section 28*a*. Then, the HMD 14 may select the data with the shorter system latency sl from these two pieces of data received and display the video represented by the selected data on the output section 52. For example, the HMD 14 may perform control such that the video represented by the data received first is displayed on the output section 52. In this case, it can also be said that the communication path is selected in accordance with the system latency sl. Also, for example, when communication in the 5

GHz band commonly takes place, communication in the 60 GHz band may also take place in a favorable communication condition.

Also, a given value based on past measured values, for example, may be used as a value indicating encoding and decoding time used for calculating the system latency sl.

Also, for example, the entertainment apparatus 12 may include a single encoder section rather than the first encoder section 28*a* and the second encoder section 28*b*. Then, when communication by the first communication section 24*a* and communication by the second communication section 24*b* takes place, the single encoder section may handle data encoding. Here, the single encoder section may encode data at a higher compression ratio at the time of communication by the second communication section 24*b* than the compression ratio at the time of communication by the first communication section 24*a*.

Also, the functions implemented by the first encoder section 28*a* and the second encoder section 28*b*, pieces of hardware, may be implemented as a program (software) executed by the control section 20.

Also, the scope of application of the present invention is not limited to a situation in which a play video is displayed on the output section 52 of the HMD 14 as described above. For example, the present invention may be applied to a situation in which content stored in the storage section 22 such as movie is displayed on the output section 52 of the HMD 14. Also, the scope of application of the present invention is not limited to video data. For example, the present invention may be applied to a situation in which audio represented by audio data generated by the entertainment apparatus 12 is output from the output section 52 of the HMD 14.

Also, for example, the roles shared by the entertainment apparatus 12 and the HMD 14 are not limited to those described above. For example, some or all of the functions illustrated in FIG. 4 may be implemented by the HMD 14. Alternatively, some or all of the functions illustrated in FIG. 5 may be implemented by the entertainment apparatus 12.

Also, the specific character strings and numbers described above and specific character strings and numbers in the drawings are illustrative, and the present invention is not limited these character strings and numbers.

The invention claimed is:

1. A communication system comprising:
an entertainment apparatus; and a head mounted display (HMD), the entertainment apparatus including:
a video generation section adapted to generate video data,
a partial video data generation section, adapted to generate partial video data,
an encoding section adapted to encode the video or partial video data,
a first transmission communications interface capable of communicating with the HMD, and
a second transmission communications interface capable of communicating with the HMD,
the HMD including:
a first reception communications interface capable of communicating with the first transmission communications interface,
a second reception communications interface capable of communicating with the second transmission communications interface, and
a decoder adapted to decode the encoded data, wherein
the first transmission communications interface sends the data generated by the video or partial video generation section and encoded by the encoding section to the first reception communications interface,
the second transmission communications interface sends the data generated by the video or partial video generation section and encoded by the encoding section to the second reception communications interface,
the first transmission communications interface has a higher maximum possible transmission rate than the second transmission communications interface, and
the encoding section encodes the data at a higher compression ratio at the time of transmission by the second transmission communications interface than the compression ratio at the time of transmission by the first transmission communications interface,
the communication system further comprising:
a central processing unit (CPU) adapted to control which data, the data received by the first reception communications interface or the data received by the second reception communications interface, is used by the HMD based on the amount of time from generation of the data by the video or partial video generation section to when the data is rendered available for use by the HMD.

2. The communication system of claim 1, wherein the CPU controls whether transmission by the first transmission communications interface or transmission by the second transmission communications interface takes place based on the amount of time from generation of the data by the video or partial video generation section to when the data is rendered available for use by the HMD.

3. The communication system of claim 2 further comprising:
a count identification section adapted to identify the number of times the amount of time from generation of the data by the video or partial video generation section to when the data is rendered available for use by the HMD exceeds a given time period when transmission by the second transmission communications interface does not take place, but transmission by the first transmission communications interface takes place,
wherein when the number of times reaches a given count, the CPU performs control such that transmission by the second transmission communications interface takes place rather than transmission by the first transmission communications interface from here onward.

4. The communication system of claim 1, wherein
the entertainment apparatus includes the CPU,
the HMD further includes an instruction section adapted to instruct the entertainment apparatus as to whether transmission by the first transmission communications interface or transmission by the second transmission communications interface should take place based on the amount of time from generation of the data by the video or partial video generation section to when the data is rendered available for use by the HMD, and
when the instruction is received from the HMD, the CPU performs control such that transmission by the first transmission communications interface or transmission by the second transmission communications interface takes place in accordance with the instruction from here onward.

5. The communication system of claim 1, wherein if a communication quality drops to a given quality or less during transmission by the second transmission communications interface, the encoder increases the compression ratio of data generated by the video or partial video generation section.

6. The communication system of claim 1, wherein
the encoding section includes a first encoding section and a second encoding section,
the first encoding section encodes the data at the time of transmission by the first transmission communications interface,
the second encoding section encodes the data at the time of transmission by the second transmission communications interface, and
the compression ratio of encoding by the second encoding section is higher than that of the first encoding section.

7. The communication system of claim 1, wherein the first reception communications interface of the HMD communicates exclusively with the first transmission communications interface of the entertainment apparatus, and
the second reception communications interface of the HMD communicates exclusively with the second transmission communications interface of the entertainment apparatus.

8. An entertainment apparatus comprising:
a video generation section adapted to generate video data;
a partial video generation section adapted to generate partial video data;
an encoding section adapted to encode the video or partial video data;
a first transmission communications interface capable of communicating with a head mounted display (HMD); and
a second transmission communications interface capable of communicating with the HMD, the entertainment apparatus capable of communicating with the HMD, the HMD including:
a first reception communications interface capable of communicating with the first transmission communications interface,
a second reception communications interface capable of communicating with the second transmission communications interface, and
a decoding section adapted to decode the encoded data, wherein
the first transmission communications interface sends the data generated by the video or partial video generation section and encoded by the encoding section to the first reception communications interface,
the second transmission communications interface sends the data generated by the video or partial video generation section and encoded by the encoding section to the second reception communications interface,
the first transmission communications interface has a higher maximum possible transmission rate than the second transmission communications interface, and
the encoding section encodes the data at a higher compression ratio at the time of transmission by the second transmission communications interface than the compression ratio at the time of transmission by the first transmission communications interface,
the entertainment apparatus further comprising:
a CPU adapted to control which data, the data received by the first reception communications interface or the data received by the second reception communications interface, is used by the HMD based on the amount of time from generation of the data by the video or partial video generation section to when the data is rendered available for use by the HMD.

9. A head mounted display (HMD) capable of communicating with an entertainment apparatus, the entertainment apparatus including:
a video generation section adapted to generate video data,
a partial video generation section adapted to generate partial video data,
an encoding section adapted to encode the data, a first transmission communications interface capable of communicating with the HMD, and
a second transmission communications interface capable of communicating with the HMD,
the HMD comprising:
a first reception communications interface capable of communicating with the first transmission communications interface;
a second reception communications interface capable of communicating with the second transmission communications interface; and
a decoding section adapted to decode the encoded data, wherein
the first transmission communications interface sends the data generated by the video or partial video generation section and encoded by the encoding section to the first reception communications interface,
the second transmission communications interface sends the data generated by the video or partial video generation section and encoded by the encoding section to the second reception communications interface,
the first transmission communications interface has a higher maximum possible transmission rate than the second transmission communications interface, and
the encoding section encodes the data at a higher compression ratio at the time of transmission by the second transmission communications interface than the compression ratio at the time of transmission by the first transmission communications interface,
the HMD further comprising:
a central processing unit (CPU) adapted to control which data, the data received by the first reception communications interface or the data received by the second reception communications interface, is used by the HMD based on the amount of time from generation of the data by the video or partial generation section to when the data is rendered available for use by the HMD.

10. A communication system control method,
the communication system control method comprising:
controlling which of the following data: (1) data received by a first reception communications interface or (2) data received by a second reception communications interface, is used by a head mounted display (HMD) based on the amount of time from generation of the data by a video or partial video generation section to when the data is rendered available for use by the HMD,
wherein an entertainment apparatus includes:
the video generation section, which is adapted to generate video data,
the partial video generation section, which is adapted to generate partial video data,
an encoding section adapted to encode the data,
a first transmission communications interface capable of communicating with the HMD, and
a second transmission communications interface capable of communicating with the HMD, the HMD including:
the first reception communications interface capable of communicating with the first transmission communications interface,
the second reception communications interface capable of communicating with the second transmission communications interface, and a decoding section adapted to decode the encoded data, wherein the first transmission communications interface sends the data generated by the video or partial video generation section and encoded by the encoding section to the first reception communications interface, the second transmission communications interface sends the data generated by the video or partial video generation section and encoded by the encoding section to the second reception communications interface, the first transmission communications interface has a higher maximum possible transmission rate than the second transmission communications interface, and the encoding section encodes the data at a higher compression ratio at the time of transmission by the second transmission communications interface than the compression ratio at the time of transmission by the first transmission communications interface.

* * * * *